United States Patent [19]
Iqbal et al.

[11] Patent Number: 5,707,722
[45] Date of Patent: *Jan. 13, 1998

[54] INK JET RECORDING SHEET

[75] Inventors: Mohammed Iqbal; Armin J. Paff; Donald J. Williams, all of Austin, Tex.

[73] Assignee: Minnesota Mining and Manufacturing Company, St. Paul, Minn.

[*] Notice: The term of this patent shall not extend beyond the expiration date of Pat. No. 5,688,603.

[21] Appl. No.: 754,718

[22] Filed: Nov. 21, 1996

Related U.S. Application Data

[63] Continuation of Ser. No. 548,439, Oct. 26, 1995, abandoned.
[51] Int. Cl.$^6$ .................................................. B41M 5/00
[52] U.S. Cl. .................. 428/304.4; 428/195; 428/478.2; 428/500; 428/522; 428/532
[58] Field of Search .......................... 428/195, 478.2, 428/500, 520, 532, 304.4, 522

[56] References Cited

U.S. PATENT DOCUMENTS

| | | | |
|---|---|---|---|
| 3,682,688 | 8/1972 | Hughes et al. | 117/168 |
| 4,554,181 | 11/1985 | Cousin et al. | 427/261 |
| 4,555,436 | 11/1985 | Tanck | 428/212 |
| 4,609,479 | 9/1986 | Smeltz | 252/8.551 |
| 4,781,985 | 11/1988 | Desjarlais | 428/421 |
| 4,935,307 | 6/1990 | Iqbal et al. | 428/308 |
| 5,045,864 | 9/1991 | Light | 346/1.1 |
| 5,068,140 | 11/1991 | Malhotra et al. | 428/216 |
| 5,084,340 | 1/1992 | Light | 428/327 |
| 5,134,198 | 7/1992 | Stofko, Jr. et al. | 525/205 |
| 5,141,797 | 8/1992 | Wheeler | 428/195 |
| 5,241,006 | 8/1993 | Iqbal et al. | 525/196 |
| 5,271,989 | 12/1993 | Mori et al. | 428/195 |
| 5,277,965 | 1/1994 | Malhotra | 428/216 |
| 5,376,727 | 12/1994 | Iqbal et al. | 525/196 |
| 5,389,723 | 2/1995 | Iqbal et al. | 525/57 |
| 5,413,843 | 5/1995 | Mann et al. | 428/211 |
| 5,429,860 | 7/1995 | Held et al. | 428/195 |

FOREIGN PATENT DOCUMENTS

| | | | |
|---|---|---|---|
| 0 529 797 A1 | 3/1993 | European Pat. Off. | B41M 5/00 |
| WO 88/06532 | 9/1988 | WIPO | B41M 5/00 |

OTHER PUBLICATIONS

*Properties of Polymers: Correlations with Chemical Structure*, Elsevier Publishing Co. (Amsterdam, London, New York, 1972), pp. 294–297.

*Primary Examiner*—Pamela R. Schwartz
*Attorney, Agent, or Firm*—Darla P. Neaveill

[57] ABSTRACT

A phase separated composition suitable for coating onto an ink-jet recording sheet comprising,
  a) at least one nonionic fluorocarbon surfactant having a hydrophilic portion and a hydrophobic portion,
  b) at least one polymer selected from the group consisting of hydroxycellulose and substituted hydroxycellulose polymers, and
  c) at least one phase separation additive
such composition being crosslinkable when subjected to temperatures of at least about 90° C., such composition forming a microporous coating.

9 Claims, No Drawings

INK JET RECORDING SHEET

This is a continuation of application Ser. No. 08/548,439 filed Oct. 26, 1995, now abandoned.

FIELD OF THE INVENTION

The invention relates to a phase-separated composition suitable for use as an ink-jet recording medium, and a microporous recording sheet coated with such compositions and subsequently crosslinked, such sheet being suitable for imaging in an ink-jet printer.

DESCRIPTION OF THE ART

Imaging devices such as ink-jet printers and pen plotters are established methods for printing various information including labels and multi-color graphics. Presentation of such information has created a demand for transparent ink receptive imageable receptors that are used as overlays in technical drawings and as transparencies for overhead projection. Imaging with either the ink-jet printer or the pen plotter involves depositing ink on the surface of these transparent receptors. These imaging devices conventionally utilize inks that can remain exposed to air for long periods of time without completely drying. Since it is desirable that the surface of these receptors be dry and non-tacky to the touch soon after imaging, even after absorption of significant amounts of liquid, it is desirable that transparent materials for imaging be capable of absorbing significant amounts of liquid while maintaining some degree of durability and transparency.

Generation of an image by an ink-jet printer results in large quantities of solvent, generally blends of glycols and water, remaining in the imaged areas. Diffusion of this solvent into unimaged areas can result in "bleeding" of the image, when the dye is carried along with the solvent.

U.S. Pat. No. 5,141,797 discloses opaque ink-jet recording sheets including a water soluble polymeric binder, a titanium chelate crosslinking agent, and an inorganic filler with a high absorption capacity, e.g., silica. The filler is present in a ratio to polymeric binder of from 2:1 to 7:1. Paper substrates are preferred. Only single layer coatings are disclosed.

Liquid-absorbent materials disclosed in U.S. Pat. No. 5,134,198 disclose one method to improve drying and decrease dry time. These materials comprise crosslinked polymeric compositions capable of forming continuous matrices for liquid absorbent semi-interpenetrating polymer networks. These networks are blends of polymers wherein at least one of the polymeric components is crosslinked after blending to form a continuous network throughout the bulk of the material, and through which the uncrosslinked polymeric components are intertwined in such a way as to form a macroscopically homogenous composition. Such compositions are useful for forming durable, ink absorbent, transparent graphical materials without the disadvantages of the materials listed above.

WO 8806532 discloses a recording transparency and an aqueous method of preparation. The transparency is coated with a hydroxyethylcellulose polymer or mixture of polymers. The coating solution may also contain a surfactant to promote leveling and adhesion to the surface, and hydrated alumina in order to impart pencil tooth to the surface.

U.S. Pat. No. 5,277,965 discloses a recording medium comprising a base sheet with an ink receiving layer on one surface, and a heat absorbing layer on the other, and an anti-curl layer coated on the surface of the heat absorbing layer. The materials suitable for the ink receptive layer can include hydrophilic materials such as binary blends of polyethylene oxide with one of the following group: hydroxypropyl methyl cellulose (Methocel), hydroxyethyl cellulose; water-soluble ethylhydroxyethyl cellulose, hydroxybutylmethyl cellulose, hydroxypropyl cellulose, methyl cellulose, hydroxyethylmethyl cellulose; vinylmethyl ether/maleic acid copolymers; acrylamide/acrylic acid copolymers; salts of carboxymethylhydroxyethyl cellulose; cellulose acetate; cellulose acetate hydrogen phthalate, hydroxypropyl methyl cellulose phthalate; cellulose sulfate; PVA; PVP; vinylalcohol/vinylacetate copolymer and so on.

U.S. Pat. No. 5,068,140 discloses a transparency comprised of a supporting substrate and an anticurl coating or coatings thereunder. In one specific embodiment, the transparency comprises of an anticurl coating comprising two layers. The ink receiving layer in one embodiment is comprised of blends of poly(ethylene oxide), mixtures of poly (ethylene oxide) with cellulose such as sodium carboxymethyl cellulose, hydroxymethyl cellulose and a component selected from the group consisting of (1) vinylmethyl ether/maleic acid copolymer; (2) hydroxypropyl cellulose; (3) acrylamide/acrylic acid copolymer, (4) sodium carboxymethylhydroxyethyl cellulose; (5) hydroxyethyl cellulose; (6) water soluble ethylhydroxyethyl cellulose; (7) cellulose sulfate; (8) poly(vinylalcohol); (9) polyvinylpyrrolidone; (10) poly(acrylamido 2-methyl propane sulfonic acid); (11) poly (diethylenetriamine-co-adipic acid); (12) poly(imidazoline) quaternized; (13) poly(N,N-methyl-3-S dimethylene piperidinum chloride; (14) poly(ethylene imine) epichlorohydrin modified; (15) poly(ethylene imine) ethoxylated; blends of poly(α-methylstyrene) with a component having a chlorinated compound.

U.S. Pat. No. 4,554,181, discloses a recording sheet for ink-jet printing having a single layer coated on a substrate. The coating, which may be on paper or film substrates, contains two key components; a mordant, and a water soluble polyvalent metal salt. The mordant is a cationic polymer material, designed to react with an acid group present on a dye molecule. The water soluble polyvalent metal salt may be from a wide selection of metals, those of group II, group III, and the transition metals of the periodic table of elements. Specific salts mentioned include calcium formate, aluminum chlorohydrate, and certain zirconium salts. A two-layer system is not disclosed.

U.S. Pat. No. 4,141,797, discloses ink-jet papers having crosslinked binders, and opaque sheets. The opacity is achieved by using a paper stock, and by including an inorganic filler in the coated layer. An titanium chelate cross linking agent is also disclosed. Tyzor® TIE is specifically mentioned. Three other patents disclose the generic use of titanium compounds as cross-linking agents, i.e., U.S. Pat. Nos. 4,609,479, 3,682,688, and 4,690,479. Binder polymers, including gelatin materials, are disclosed, as is use of a mordant.

U.S. Pat. No. 4,781,985 discloses a film support having a coating thereon, such coating containing one of two possible general structures of ionic fluorocarbon surfactants. One of these two general structures is characterized by a quaternary ammonium compound having a side chain containing a sulfide linkage; the other general structure contains the element phosphorus. It is disclosed that other fluorochemical surfactants will not provide the benefits of these two structures. No two layer coating systems are disclosed.

U.S. Pat. No. 5,429,860 discloses an ink/media combination, with a purpose to arrive at a superior final copy by designing the ink to match the film, and vice-versa. An external energy source is used to effect a fix step after the ink has been brought in contact with the medium. At least one multivalent metal salt, Tyzor® 131, is disclosed, as are generic organic titanates.

U.S. Pat. Nos. 5,045,864 and 5,084,340, disclose a single layer image-recording elements comprising an ink receptive layer including containing 50-80 percent of a specific polyester particulate material, i.e., poly (cyclohexylenedimethylene-co-oxydiethelene isophthalate-co-sodio-sulfobenzenedicarboxyolates), 15-50% vinylpyrrolidone, and minor amounts of a short chain alkylene oxide homopolymer or copolymer, a fluorochemical surfactant and inert particles.

The present inventors have now discovered that an inkjet film comprising certain nonionic surfactants, cellulosic polymers, and phase-separation additives provides high density images which are tack-flee and permanent, and which have substantially no color bleed, while drying very quickly.

SUMMARY OF THE INVENTION

The invention provides a composition suitable for use on an ink-jet recording sheet, an ink-jet recording sheet having said composition coated onto at least one major surface, and an ink-jet recording sheet having a two layer coating structure.

Phase-separated compositions of the invention comprise:
a) at least one nonionic fluorocarbon surfactant,
b) at least one polymer selected from the group consisting of hydroxycellulose and substituted hydroxycellulose polymers, and
c) at least one phase separation additive such composition being crosslinkable when subjected to temperatures of at least about 90° C., such composition forming a microporous coating when dried at elevated temperatures.

Ink-jet recording sheets of the invention comprise a film substrate having two major surfaces, at least one major surface having coated thereon a composition comprising from about 0.05% to about 6% of at least one nonionic fluorocarbon surfactant having a hydrophilic portion and a hydrophobic portion, and from about to about 94% of at least one polymer selected from the group consisting of hydroxycellulose and substituted hydroxycellulose polymers, and at least one phase separation additive, said composition having been crosslinked on said substrate by means of heating.

Preferred ink-jet recording sheets of the invention comprise an ink-jet recording sheet wherein at least one layer is microporous, comprising a two-layer imageable coating comprising:
a) a thick absorptive bottom layer comprising at least one crosslinkable polymeric component, and
b) an optically clear, thin top layer comprising at least one nonionic fluorocarbon surfactant having a hydrophilic portion and a hydrophobic portion, at least one layer comprising a phase-separation additive, said top layer having been crosslinked on said substrate by heat.

Preferred two-layer coatings having at least one microporous layer comprise
a) a thick absorptive bottom layer comprising
i) at least one crosslinkable polymeric component;
ii) at least one liquid-absorbent component comprising a water-absorbent polymer, and
iii) from 0 to about 5% of a crosslinking agent, b) an optically clear, thin top layer comprising
i) from about 0.05% to about 6% of at least one nonionic fluorocarbon surfactant having a hydrophilic portion and a hydrophobic portion, and
ii) from about 14% to about 94% of a hydroxycellulose or substituted hydroxycellulose polymer,
at least one of said layers further comprising from about 0.5% to about 10% of a phase-separation additive, said coating having been crosslinked on a substrate by application of heat.

In one preferred embodiment, the two-layer coating comprises:
a) a thick absorptive bottom layer comprising
i) at least one crosslinkable polymeric component;
ii) at least one liquid-absorbent component comprising a water-absorbent polymer, and
iii) from 0 to about 5% of a crosslinking agent,
b) an optically clear, thin top layer comprising
i) from about 0.05% to about 6% of at least one nonionic fluorocarbon surfactant having a hydrophilic portion and a hydrophobic portion,
ii) from about 14% to about 94% of a hydroxycellulose or substituted hydroxycellulose polymer, and
iii) from 0 to about 80% of an metal chelate wherein said metal is selected from the group consisting of titanium, aluminum and zirconium,
at least one of said layers comprising from about 0.5% to about 10% of a phase-separation additive, said coating having been crosslinked on a substrate by application of heat.

The following terms have these meanings as used herein:
1. The term "semi-interpenetrating network" means an entanglement of a homocrosslinked polymer with a linear uncrosslinked polymer.
2. The term "SIPN" refers to a semi-interpenetrating network.
3. The term "mordant" means a compound which, when present in a composition, interacts with a dye to prevent diffusion through the composition.
4. The term "crosslinkable" means capable of forming covalent or strong ionic bonds with itself or with a separate agent added for this purpose.
5. The term "hydrophilic" is used to describe a material that is generally receptive to water, either in the sense that its surface is wettable by water or in the sense that the bulk of the material is able to absorb significant quantities of water. Materials that exhibit surface wettability by water have hydrophilic surfaces. Monomeric units will be referred to as hydrophilic units if they have a water-sorption capacity of at least one mole of water per mole of monomeric unit.
6. The term "hydrophobic" refers to materials which have surfaces not readily wettable by water. Monomeric units will be referred to as hydrophobic if they form water-insoluble polymers capable of absorbing only small mounts of water when polymerized by themselves.
7. The term "surfactant" means a compound which reduces surface tension, thereby increasing surface wetting.
8. The term "optically clear" means that the majority of light passing through does not scatter.
9. The term "chelate" means a coordination compound in which a central metal ion is attached by coordinate links to two or more nonmetal ligands, which form heterocyclic rings with the metal ion being a part of each ring.
10. The term "phase separation" refers to a solution or mixture having at least two physically distinct regions.
11. The term "microporous" means containing a multiplicity of small voids in the volume, at least some of which are interconnected.

All parts, percents and ratios herein are by weight, unless specifically stated otherwise.

DETAILED DESCRIPTION OF THE INVENTION

Compositions of the invention are suitable for coating onto ink-jet recording sheets. Such compositions are phase-separated, are crosslinkable with the application of heat, and comprise at least one nonionic fluorocarbon surfactant having a hydrophilic portion and a hydrophobic portion, and at least one cellulosic material selected from the group consisting of hydroxycellulose and substituted hydroxycellulose polymers, such composition being crosslinkable when subjected to temperatures of at least about 90° C. The layer also contains a small amount of a phase separation additive, which is an incompatible polymer, in order to facilitate the separation of the composition into phases. When such phase separated compositions are coated, heated and dried, they form microporous coatings, having a multiplicity of microvoids in the volume.

Nonionic fluorocarbon surfactants useful in compositions of the invention are those having at least a weakly hydrophilic portion and a hydrophobic portion. Useful surfactants include linear perfluorinated polyethoxylated alcohols, fluorinated alkyl polyoxyethylene alcohols, and fluorinated alkyl alkoxylates.

Preferred nonionic fluorocarbon surfactants are those having a strongly hydrophilic end and a strongly hydrophobic end. The hydrophobic end allows effective blooming to the surface of the coated layer, and the hydrophilic end provides a high surface energy moiety which interacts with Water-based inks to give uniform images. Preferred surfactants are fluorinated polyethoxylated alcohols.

Commercially available nonionic surfactants include fluorochemical surfactants such as the perfluorinated polyethoxylated alcohols available as Zonyl FSO®, Zonyl FSN®, and the 100% pure versions thereof Zonyl FSO-100®, having the following structure,

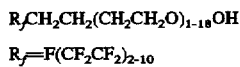

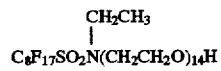

and Zonyl FSN-100®, from DuPont; and the fluorinated alkyl polyoxyethylene alcohols available as Fluorad® FC-170C, having the following structure:

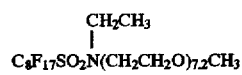

and Fluorad® 171C, available from Minnesota Mining and Manufacturing Company (3M), which can be represented as the following:

$$\begin{array}{c} CH_2CH_3 \\ | \\ C_8F_{17}SO_2N(CH_2CH_2O)_{7.2}CH_3 \end{array}$$

While the preferred level will vary with the particular nonionic fluorocarbon surfactant used, compositions of the invention typically comprise up to about 10%, preferably from about 0.05% to about 6% of said surfactant. When a fluorocarbon surfactant comprising a polyethoxylated alcohol is used, the composition preferably comprises from about 0.5% to about 3% percent of the composition.

The compositions comprises at least about 14% to about 94% of at least one hydroxycellulose polymer. Useful hydroxycellulosic materials include hydroxymethylcellulose, hydroxypropylcellulose, hydroxyethyl-cellulose and the like.

Useful phase separation additives are polymers incompatible with the hydroxycellulose or hydroxymethylcellulose polymer even in relatively small amounts, e.g., from about 0.5% to about 10%, preferably under 5%. Such polymers thereby facilitate the phase separation, and subsequent microporosity, when added in small mounts which will not otherwise substantially affect the imaging characteristics. This includes many, if not most, water soluble polymers. Useful examples include poly(vinylalcohol) and poly(vinylpyrrolidone), polyacrylamide, gelatin, and blends thereof. Commercially available examples include Airvol® 520, and Gohsehnol® KPO, both poly(vinylalcohol)s, and "Copolymer 958", a poly(vinylpyrrolidone/ dimethylaminoethyl methacrylate), available from GAF Corporation, and the like:

Ink-jet recording sheets of the inventions comprise a substrate having coated thereon a single layer which comprises the essential ingredients of compositions of the invention. Single-layer compositions are phase-separated compositions comprising at least one nonionic fluorocarbon surfactant having a hydrophilic portion and a hydrophobic portion, and at least one cellulose material selected from the group consisting of hydroxycellulose and substituted hydroxycellulose polymers.

The composition is not crosslinked prior to coating onto the sheet, but is coated as the uncrosslinked composition described supra, and after coating, is crosslinked by the application of heat. This is typically done in a drying oven. While not wishing to be bound by theory, it is believed that the nonionic fluorosurfactant blooms to the surface after coating. This provides improved optical density properties, as well as allowing the hydrophilic portion of the surfactant to convey the large ink-drops used in ink-jet imaging through the layer where it can be absorbed. If the composition were crosslinked prior to coating, the surfactant would be trapped within the crosslinked network, requiting a much higher concentration in order for any to be present on the surface.

Preferred single-layer ink-jet recording sheets of the invention comprise from about 0.05% to about 6% percent of a nonionic fluorocarbon surfactant, from about 14% to about 94% of at least one cellulosic polymer selected from the group consisting of hydroxycellulose and substituted hydroxycellulose polymers, such as hydroxyethyl cellulose, hydroxypropylmethylcellulose and the like, and from 0.5% to about 10% of a phase-separation additive.

Such single layer coating may also include additional adjuvants such as mordants, polymeric microspheres, anti-curling agents such as polyethylene glycols, and the like.

Preferred ink-jet recording sheets of the invention comprise a two-layer coating system including an optically clear top layer, and an ink-absorptive underlayer.

The top layer is an optically clear, thin layer comprising at least one nonionic fluorocarbon surfactant having a hydrophilic potion and a hydrophobic portion, and at least one cellulosic material selected from hydroxycellulose and substituted hydroxycellulose polymers.

The top layer comprises from about 0.05% to about 10% of the nonionic surfactant, with the same surfactants being preferred as those described for the single layer coating.

The top layer comprises at least about 14% to about 94% of at least one hydroxycellulose polymer. Useful hydroxycellulosic materials include hydroxymethylcellulose, hydroxypropylcellulose, hydroxyethyl-cellulose and the like. Such materials are available commercially, e.g., as Methocel® series denoted A, E, F, J, K, e.g., Methocel® F-50, Methocel® A4M, and the like from Dow Chemical Company.

At least one layer of the system also contains from about 0.5% to about 10%, preferably to about 5% of a phase-separation additive as described, supra.

When the top layer is microporous, the microporosity allows capillary suction of the ink through the top layer to the underlayer, which is highly absorptive. When the underlayer is microporous, the absorption of the ink by this layer is accomplished in a greatly reduced time. This yields improvements in dry time characteristics for the ink-recording sheet. When both layers are microporous, dry time is significantly decreased.

In one embodiment of the invention, the single layer, or two layer system may also comprise a metal chelate. Useful metal chelates include titanate chelates, zirconate chelates and aluminum chelates. Such chelates typically do not undergo immediate hydrolysis when mixed with crosslinkable materials, but will remain unreactive unless activated by raising the temperature which causes the structure of the chelate to begin breaking down. The exact temperature required will depend on the activity of the other ingredients with which the chelate is mixed, and the functional groups on the metal chelate. Useful functional groups include esters, amines, acetonates, and the like, e.g., triethanolamine metal chelates and acetyl acetonate chelates. Chelates containing aluminum and titanate are preferred, with triethanolamine titanate chelates being highly preferred.

It is believed that the metal chelates do not undergo solvolysis when combined with the other ingredients, but rather begin to crosslink when heated during film drying. The chelates are complexed, the chelates provide titanate metal ions which are then complexed with a hydroxycellulose material, and are convened to the corresponding metal oxide or hydroxide in the cellulose matrix. The metal ions then undergo further reaction with the alkanolamine which regenerates the titanate alkanolamine chelates in hydroxylate form. The solvolysis profile is shown below:

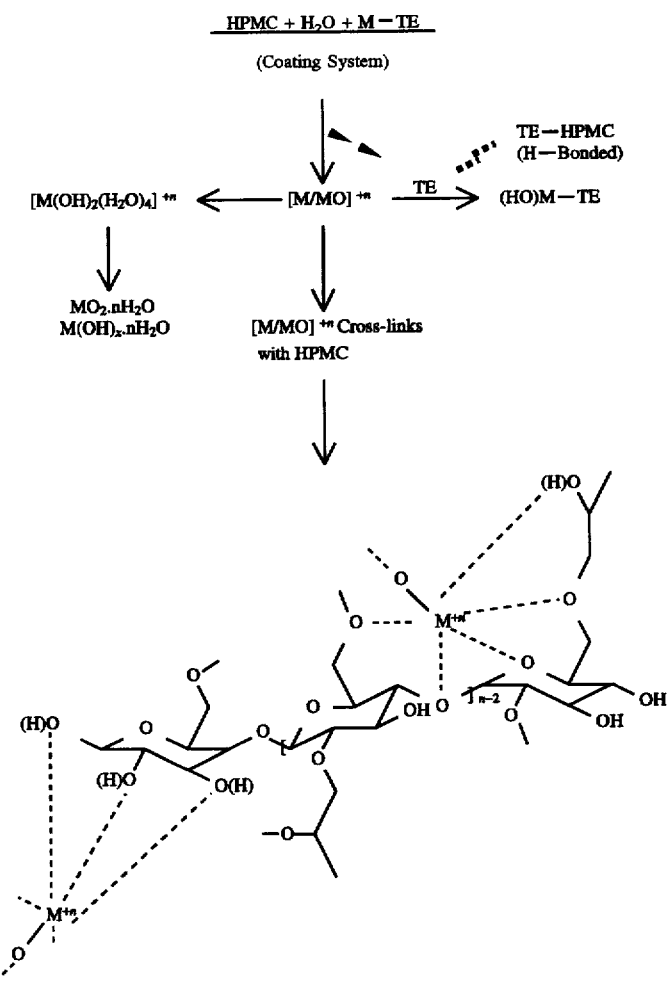

Commercially available chelates include triethanolamine titanate chelates, available as Tyzor® TE; ethyl acetoacetate titanate chelate, Tyzor® DC; lactic acid titanate chelate, Tyzor® LA and acetylacetonate titanate chelate, Tyzor® GBA, available from E.I. DuPont de Nemours (DuPont).

When used, single layer coatings of the invention or top layers of two-layer coating systems comprise from about 5% to about 80% of the metal chelate, preferably from about 5% to about 35% percent.

The top layer may also includes particulates, such as polymeric microspheres or beads, which may be hollow or solid, for the purpose of improving handling and flexibility. Preferred particulate materials are formed form polymeric materials such as poly(methylmethacrylate), poly(stearyl methacrylate) hexanedioldiacrylate copolymers, poly (tetrafluoroethylene), polyethylene; starch and silica. Poly (methylmethacrylate) beads are most preferred. Levels of particulate are limited by the requirement that the final coating be transparent with a haze level of 15% or less, as measured according to ASTM D1003-61 (Reapproved 1979). The preferred mean particle diameter for particulate material is from about 5 to about 40 micrometers, with at least 25% of the particles having a diameter of 15 micrometers or more. Most preferably, at least about 50% of the particulate material has a diameter of from about 20 micrometers to about 40 micrometers.

The absorptive underlayer comprises a polymeric ink-receptive material. Although at least one of the polymers present in the polymeric ink-receptive material is preferably crosslinkable, the system need not be crosslinked to exhibit the improved longevity and reduced bleeding. Such crosslinked systems have advantages for dry time, as disclosed in U.S. Pat. 5,134,198 (Iqbal), incorporated herein by reference.

Preferably the underlayer comprises a polymeric blend containing at least one water-absorbing, hydrophilic, polymeric material, and at least one hydrophobic polymeric material incorporating acid functional groups. Sorption capacities of various monomeric units are given, for example, in D. W. Van Krevelin, with the collaboration of P. J. Hoftyzer, *Properties of Polymers: Correlations with Chemical Structure*, Elsevier Publishing Company (Amsterdam, London, New York, 1972), pages 294–296. Commercially available polymers include "Copolymer 958", a poly(vinylpyrrolidone/ dimethylaminoethylmethacrylate), available from GAF Corporation, and the like.

The water-absorbing hydrophilic polymeric material comprises homopolymers or copolymers of monomeric units selected from vinyl lactams, alkyl tertiary amino alkyl acrylates or methacrylates, alkyl quaternary amino alkyl acrylates or methacrylates, 2-vinylpyridine and 4-vinylpyridine. Polymerization of these monomers can be conducted by free-radical techniques with conditions such as time, temperature, proportions of monomeric units, and the like, adjusted to obtain the desired properties of the final polymer.

Hydrophobic polymeric materials are preferably derived from combinations of acrylic or other hydrophobic ethylenically unsaturated monomeric units copolymerized with monomeric units having acid functionality. The hydrophobic monomeric units are capable of forming water-insoluble polymers when polymerized alone, and contain no pendant alkyl groups having more than 10 carbon atoms. They also are capable of being copolymerized with at least one species of acid-functional monomeric unit.

Preferred hydrophobic monomeric units are preferably selected from certain acrylates and methacrylates, e.g., methyl(meth)acrylate, ethyl(meth)acrylate, acrylonitrile, styrene or a-methylstyrene, and vinyl acetate. Preferred acid functional monomeric units for polymerization with the hydrophobic monomeric units are acrylic acid and methacrylic acid in amounts of from about 2% to about 20%.

In a preferred embodiment, the underlayer coating is a semi-interpenetrating network (SIPN). The SIPN of the present invention comprises crosslinkable polymers that are either hydrophobic or hydrophilic in nature, and can be derived from the copolymerization of acrylic or other hydrophobic or hydrophilic ethylenically unsaturated monomeric units with monomers having acidic groups, or if pendant ester groups are already present in these acrylic or ethylenically unsaturated monomeric units, by hydrolysis. The SIPN for this ink-receptive coating would be formed from polymer blends comprising at least one crosslinkable polyethylene-acrylic acid copolymer, at least one hydrophilic liquid absorbent polymer, and optionally, a crosslinking agent. The SIPNs are continuous networks wherein the crosslinked polymer forms a continuous matrix, as disclosed in U.S. Pat. Nos. 5,389,723, 5,241,006, 5,376,727.

Preferred SIPNs to be used for forming underlayer layers of the present invention comprise from about 25 to about 99 percent crosslinkable polymer, preferably from about 30 to about 60 percent. The liquid-absorbent component can comprise from about 1 to about 75 percent, preferably from about 40 to about 70 percent of the total SIPNs.

The crosslinking agent is preferably selected from the group of polyfunctional aziridines possessing at least two crosslinking sites per molecule, such as trimethylol propane-tris-(β-(N-aziridinyl)propionate),

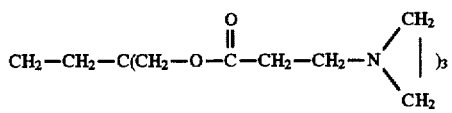

pentaerythritol-tris-(β-(N-aziridinyl)propionate),

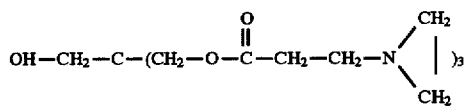

trimethylolpropane-tris-(β-(N-methylaziridinyl) propionate)

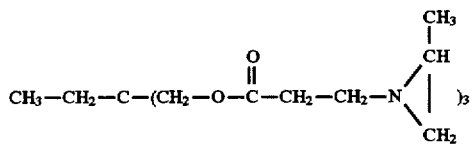

and so on. When used, the crosslinking agent typically comprises from about 0.5 to 6.0 percent crosslinking agent, preferably from about 1.0 to 4.5 percent.

The underlayer may also comprise a mordant for reduction of ink fade and bleed. When present, the mordant preferably comprises from about 1 part by weight to 20 parts by weight of the solids, preferably from about 3 parts by weight to 10 parts by weight.

Useful mordants include polymeric mordants having at least one guanidine functionality having the following general structure:

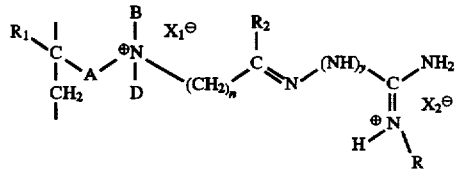

wherein A is selected from the group consisting of a COO-alkylene group having fore about 1 to about 5 carbon atoms, a CONH-alkylene group having from about 1 to about 5 carbon atoms, $COO(CH_2CH_2O)_nCH_2$— and $CONH(CH_2CH_2O)_nCH_2$—, wherein n is from about 1 to about 5;

B and D are separately selected from the group consisting of alkyl group having from about 1 to about 5 carbon atoms; or A, B, D and N are combined to form a heterocyclic compound selected from the group consisting of:

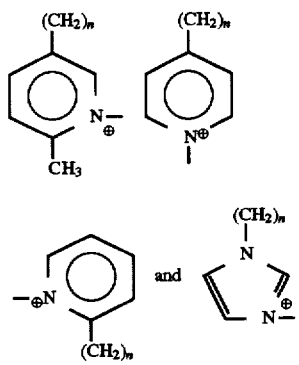

$R_1$ and $R_2$ are independently selected from the group consisting of hydrogen, phenyl, and an alkyl group containing from about 1 to about 5 carbon atoms, preferably from about 1 to about 3 carbon atoms.

R is selected from the group consisting of hydrogen, phenyl, benzimidazolyl, and an alkyl group containing from about 1 to about 5 carbon atoms, preferably fore about 1 to about 3 carbon atoms, y is selected from the group consisting of 0 and 1, and $X_1$ and $X_2$ are anions.

The underlayer formulation can be prepared by dissolving the components in a common solvent. Well-known methods for selecting a common solvent make use of Hansen parameters, as described in U.S. Pat. No. 4,935,307, incorporated herein by reference.

The two layers can be applied to the film substrate by any conventional coating technique, e.g., deposition from a solution or dispersion of the resins in a solvent or aqueous medium, or blend thereof, by means of such processes as Meyer bar coating, knife coating, reverse roll coating, rotogravure coating, and the like. The base layer is preferably coated to a thickness of from about 0.5 μm to about 10 μm, and the top layer preferably has a thickness of from about 0.5 μm to about 10 μm.

Drying of the layers can be effected by conventional drying techniques, e.g., by heating in a hot air oven at a temperature appropriate for the specific film substrate chosen. However, the drying temperature must be at least about 90° C., preferably at least about 120° C. in order to crosslink the metal chelate and form the colloidal gel with the hydroxycellulose polymer.

Additional additives can also be incorporated into either layer to improve processing, including thickeners such as xanthan gum, catalysts, thickeners, adhesion promoters, glycols, defoamers, antistatic materials, and the like. Likewise, additives such as the mordant, may be present in the top layer rather than the base layer or in both layers. An additive which may be present in the underlayer to control curl is a plasticizing compound. Useful compounds include, e.g., low molecular weight polyethylene glycols, polypropylene glycols, or polyethers; for example PEG 600, Pycal® 94, and Carbowax® 600.

Film substrates may be formed from any polymer capable of forming a self-supporting sheet, e.g., films of cellulose esters such as cellulose triacetate or diacetate, polystyrene, polyamides, vinyl chloride polymers and copolymers, polyolefin and polyallomer polymers and copolymers, polysulphones, polycarbonates and polyesters. Suitable polyester films may be produced from polyesters obtained by condensing one or more dicarboxylic acids or their lower alkyl diesters in which the alkyl group contains up to about 6 carbon atoms, e.g., terephthalic acid, isophthalic, phthalic, 2,5-, 2,6-, and 2,7-naphthalene dicarboxylic acid, succinic acid, sebacic acid, adipic acid, azelaic acid, with one or more glycols such as ethylene glycol, 1,3-propanediol, 1,4-butanediol, and the like.

Preferred film substrates are cellulose triacetate or cellulose diacetate, polyesters, especially poly(ethylene terephthalate), and polystyrene films. Poly(ethylene terephthalate) is most preferred. It is preferred that fill substrates have a caliper ranging from about 50 micrometers to about 125 micrometers. Film substrates having a caliper of less than about 50 micrometers are difficult to handle using conventional methods for graphic materials. Film substrates having calipers over 125 micrometers are very stiff, and present feeding difficulties in certain commercially available ink-jet printers and pen plotters.

When polyester or polystyrene film substrates are used, they are preferably biaxially oriented, and may also be heat set for dimensional stability during fusion of the image to the support. These films may be produced by any conventional method in which the film is biaxially stretched to impart molecular orientation and is dimensionally stabilized by heat setting.

To promote adhesion of the underlayer to the film substrate, it may be desirable to treat the surface of the film substrate with one or more primers, in single or multiple layers. Useful primers include those known to have a swelling effect on the film substrate polymer. Examples include halogenated phenols dissolved in organic solvents. Alternatively, the surface of the film substrate may be modified by treatment such as corona treatment or plasma treatment.

The primer layer, when used, should be relatively thin, preferably less than 2 micrometers, most preferably less than 1 micrometer, and may be coated by conventional coating methods.

Transparencies of the invention are particularly useful in the production of imaged transparencies for viewing in a transmission mode, e.g., in association with an overhead projector.

The following examples are for illustrative purposes, and do not limit the scope of the invention, which is that defined by the claims.

Test Methods

Image Density

The transmissive image density is measured by imaging the color desired, and measuring using a Macbeth TD 903 densitometer with the gold and status A filters. Black image density is evaluated by measuring the density of a solid fill black rectangle image.

Dry Time

The environmental conditions for this test are 70° C. and 50% relative humidity (RH). The print pattern consists of solid fill columns of adjacent colors. The columns are 0.64 cm to 1.27 cm wide, and 15–23 centimeters long. After printing the material is placed on a flat surface, then placed in contact with bond paper. A 2 kg rubber roller 6.3 cm wide is then twice rolled over the paper. The paper is then removed, and the dry time, $D_T$ is calculated by using the following formula:

$D_T = T_D + (L_T/L_P)T_P$ where $T_D$ is the length of time between the end of the printing and placing the image in contact with the bond paper; $L_T$ is the length of image transfer to paper; $L_P$ is the length of the printed columns; and $T_P$ is the time of printing.

Surface Energy

Surface energy values are tested using a Wilhelmy balance, model DCA-322. The testing is done at ambient room temperature, and the balance is operated at a rate of 136 microns/minute over a distance of 20 mm.

The samples are prepared by cutting two pieces of coated film, placing adhesive on the back of one piece using Scotch® Permanent Adhesive Glue Stick, and the pieces are attached together with finger pressure for several minutes in a back to back position, being careful not to touch the coated service. The samples are allowed to dry overnight before the measurements. Measurements are made using three liquids for certainty, one polar liquid (HPLC grade water), having a surface energy of 72.8 dynes/cm and one nonpolar liquid (99+% pure) hexadecane, from Aldrich Chemical) having a surface energy of 48.3 dynes/cm, are required; ethylene glycol (99.8%, from Aldrich Chemical) was used as the third liquid.

The sample is placed on a plate, and contacted with the liquid. The excess force resulting from surface tension is measured. Identical film samples are contacted with each of the liquids and the surface energy of the sample is calculated.

EXAMPLES

Examples 1–4

A layer having the following underlayer composition was coated onto a polyvinylidiene chloride primed polyester substrate (substrate thickness—100 µm) to give a dry coating weight of 0.97 gm/m², and after being allowed to dry for 2 minutes at 100° C. The top layer containing the nonionic surfactant and phase separation additive described below was then coated onto the underlayer at 75 µm wet thickness and dried at 120° C. for 1 min. This was Example 1.

The ink-recording sheet were then imaged on an Hewlett Packard Deskjet® 850 ink-jet printer, and yielded a black density of 0.94.

An identical underlayer was overcoated with 3 different top layer compositions, as described in Table 1, and the amounts and results are shown below.

The mordant disclosed has the following structure:

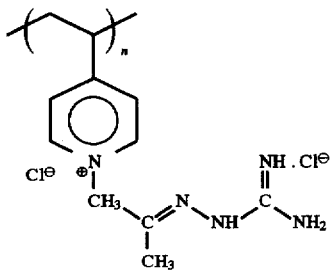

wherein n is an integer of 2 or greater.

| Underlayer Composition | | |
|---|---|---|
| PVP/DMAEMA [Copolymer-958] (50%) | 52% | |
| PVA Blend [Airvol520 + Gohsehnol KPO-6] (12.2%) | 34% | |
| Polyethylene glycol [Carbowax-600](50%) | 7.8% | |
| Mordant P134 (20%) | 3.8% | |
| Hydroxypropylmethyl[Methocel ® F-50] (4%) | 1.4% | |
| Cross-linker XAMA-7 (16%) [polyfunctional aziridine] | 1.5% | |
| | | Black density |
| Top Layer Composition for Example 1 | | |
| 3MFC-170C | 3.3% | |
| Methocel ® blend (F-50/F4M-75/25) | 83% | 0.94 |
| Carbowax ® 8000 | 3.3% | |
| Mordant | 5% | |
| Top Layer Composition for Example 2 | | |
| Zonyl ® FSO | 3.0% | |
| Methocel ® blend (F-50/F4M-75/25) | 83.3% | |
| Carbowax ® 8000 | 8.7% | |
| Mordant | 5.0% | 0.94 |
| Top Layer Composition for Example 3 | | |
| Zonyl ® FSO | 3.3% | |
| Sancure ® 847 | 66.3% | |
| PVP-K90 [polyvinylpyrrolidone] | 6.6% | |
| Airvol ® 540 [polyvinylalcohol] | 23.8% | 0.88 |
| Top Layer Composition for Example 4 | | |
| FC-170C | 3.3% | |
| Sancure ® 847* | 66.3% | |
| PVP-K90 [polyvinylpyrrolidone] | 6.6% | |
| Airvol ® 540 [polyvinylalcohol] | 23.8% | 0.92 |

*a proprietary high performance water-borne urethane polymer, made by B.F. Goodrich

Example 5

A layer having the following underlayer composition Was coated onto a polyvinylidiene chloride primed polyester substrate (substrate thickness—100 µm) at a wet thickness of 125 µm, and dried for 2 minutes at 120° C. The nonionic surfactant and phase separation additive containing top layer described below was then coated onto the underlayer at 100 µm wet thickness and dried at 120° C. for 1 min. This was Example 1. The ink-recording sheet were then imaged on a Canon CJ-10 ink-jet copier. The optical density was 0.90.

Example 6 and Comparative Examples C7–C13

The underlayer in each of the following examples was machine coated onto 100 µm polvinylidene chloride (PVDC) primed poly(ethylene terephthalate) to give a dry coat weight of 9.7 g/m². The coating comprises 29.6% polyvinylalcohol, available as Airvol® 520 from Air Products, 5.2% of a polyvinylaicohol having a different hydrolysis number, available as Cohensol® KP06 from Nippon Synthetic Chemical, 52.2% of a copolymer of poly(vinylpyrrolidone)/dimethylaminoethylmethacrylate, available as "Copolymer 958" from GAF, and 10% polyethylene glycol, available as Carbowax® 600 from Union Carbide.

The top coat for each example contained 10% Tyzor® TE, a triethanolamine titanate chelate, and 10% poly (methylmethacrylate) beads as well as the varying ingredients described in the following table for a complete 100%. Each of the examples was knife coated 75 µm thick wet atop the underlayer, and dried at about 95° C. for 2 minutes. This gives a dry coating weight of 0.08–0.10 g/m².

The films were then evaluated by imaging a solid fill black rectangle on the Epson Stylus Printer® using the transparency print mode. The optical density of each image is then measured.

| Example No. | Methocel F50 wt % | Zonyl FSO wt % | Zonyl UR wt % | Zonyl FSJ wt % | O.D. |
|---|---|---|---|---|---|
| C7 | 80 | | | | 0.72 |
| 6 | 77 | 3 | | | 0.92 |
| C8 | 79 | | 1 | | 0.64 |
| C9 | 77 | | 3 | | 0.63 |
| C10 | 75 | | 5 | | 0.62 |
| C11 | 79 | | | 1 | 0.64 |
| C12 | 77 | | | 3 | 0.66 |
| C13 | 75 | | | 5 | 0.65 |

As can be seen from the data, the fluorocarbon of Example 6, the only nonionic fluorocarbon surfactant used, provided superior optical density and the anionic surfactants employed in Comparative Examples C–C45 did not.

Wilhelmy balance measurements were also completed for Example 6 and Comparative Examples C7–C13. As the following table shows, the nonionic fluorocarbon surfactant has the highest surface energy with the two anionic surfactants at all three different concentrations having much lower surface energies.

| Example No. | Surfactant | Total surface energy (dynes/cm) |
|---|---|---|
| 6 | 3% Zonyl FSO (3410) | 38.0 |
| C7 | no surfactant | 31.9 |
| C8 | 1% Zonyl ® FSJ | 17.5 |
| C9 | 3% Zonyl ® FSJ | 16.5 |
| C10 | 5% Zonyl ® FSJ | 18.5 |
| C11 | 1% Zonyl ® UR | 19.8 |
| C12 | 3% Zonyl ® UR | 14.9 |
| C13 | 5% Zonyl ® UR | 17.9 |

Example 14

An ink-jet recording sheet was made as follows. The film substrate provided was a 100 µm white microvoided polyester having an opacity of 90%. A two layer ink-jet coating system was coated thereon. The underlayer contained 29.6% polyvinylalcohol as Airvol 523, 5.2% polyvinylalcohol as Gohesnol KPO6, 52.2% of a copolymer of PVP/DMAEMA as "Copolymer 958", and 10% polyethylene glycol as Carbowax® 600, and 3% of a mordant, having the structure disclosed in Example 1, supra. This layer was machine coated to give a dry coating weight of about 9.7 g/m².

The top layer contained 77% Methocel F50, 10% Tyzor TE, 10% PMMA beads, and 3% Zonyl FSO. This layer was machine coated to give a dry coating weight of 0.81 g/m². The ink-jet recording Sheet was dried at 121° C. for 1 minute.

When imaged on the Epson Stylus® Printer using the media setting for special coated paper, and the microweave print option, the images were of excellent quality at both 360 dpi and 720 dpi resolution.

Example 15

A single layer having the following underlayer composition was coated onto a primed polyester substrate, and after being dried for 2 minutes at 100° C. The nonionic surfactant and metal chelate containing top layer described below was then coated onto the underlayer at 75 µm wet thickness and dried at 100° C. for 1 min. The ink-jet recording sheet was imagined on a Hewlett Packard Deskjet® 850, and gave a uniform black imaging which dried quickly with no signs of cracking or crazing.

| Single Layer Composition | |
|---|---|
| Copolymer 958 | 46.6% |
| PVA Blend [Airvol-520 + Gohsehnol KPO-6](12.2%) | 38.1% |
| Polyethylene glycol [Carbowax-600](50%) | 6.78% |
| Mordant P134 (20%) | 4.58% |
| Hydroxypropylmethylcellulose[Methocel ® F-50] (4%) | 1.5% |
| Polymethylmethacrylate beads (10%) | 0.98% |
| Polyfunctional Aziridine (XAMA-7) | 1.4% |

Example 16

An ink-jet recording sheet was made as follows. The substrate provided was PVDC primed polyester film. A two-layer coating system was coated thereon. The underlayer contained 34% PVA blend, 52% Copolymer 958, and 7.8% Carbowax® 600, 1.4% Methocel F50, and 3.8% P134 mordant, having the structure disclosed in Example 1. This layer was machine coated to give a dry coating weight of about 9.7 g/m².

The top layer was coated wet in 50 µm thickness, and contained 41% hydroxypropylmethyl cellulose (Methotel F50), 39% acetyl acetonate (Tyzor GBA), 7.2% polyethylene glycol (Carbowax®8000), 10% poly (methylmethacrylate) (PMMA) beads, and 3% Zonyl® FSO. The ink-jet recording sheet was dried at 121° C. for 1 minute.

When imaged on the Epson Stylus® Printer, the density was 0.92.

Example 17

The underlayer was coated as described below, and a top layer containing 34% zirconium triethanolamine chelate, 65% hydroxypropylmethylcellulose and 1% Zonyl® FSO, was coated onto the underlayer in at 75 µm wet thickness at 120° C. for 1 min.

The Black density was between 0.91 and 0.93.

| Underlayer Composition | |
|---|---|
| PVP/DMAEMA [Copolymer-958] (50%) | 52% |
| PVA Blend [Airvol-520 + Gohsehnol KPO-6](12.2%) | 34.7% |
| Polyethylene glycol [Carbowax-600](50%) | 7.8% |
| Mordant P134 (20%) | 3.8% |
| Hydroxypropylmethylcellulose [Methocel ® F-50] (4%) | 1.4% |
| Cross-linker XAMA-7 (16%)[polyfunctional aziridine] | 0.33% |

What is claimed is:

1. An ink-jet recording sheet comprising a film substrate bearing on at least one major surface thereon a two-layer imageable coating system wherein at least one of said layers is microporous, comprising:

a) an absorptive bottom layer comprising at least one crosslinkable polymeric component and at least one water-absorbing hydrophilic polymeric material, and b) an optically clear top layer comprising at least one nonionic fluorocarbon surfactant having a hydrophilic portion and a hydrophobic portion, and at least one polymer selected from the group consisting of hydroxycellulose and substituted hydroxycellulose polymers, said top layer having been crosslinked on said film substrate by application of heat.

2. An ink-jet recording sheet according to claim 1 wherein said two-layer coating comprises
   a) a absorptive bottom layer comprising
      i) at least one crosslinkable polymeric component;
      ii) at least water-absorbing hydrophilic material, and
      iii) from 0 to about 5% of a crosslinking agent
   b) an optically clear, microporous top layer comprising
      i) from about 0.05% to about 6% of at least one nonionic fluorocarbon surfactant having a hydrophilic portion and a hydrophobic portion,
      ii) from about 14% to about 94% of a hydroxycellulose or substituted hydroxycellulose polymer, and
      iii) from about 0.05% to about 10% of a phase separation additive.

3. An ink-jet recording sheet according to claim 1 wherein said top layer comprises a fluorocarbon surfactant selected from the group consisting of linear perfluorinated polyethoxylated alcohols, fluorinated alkyl polyoxyethylene alcohols, and fluorinated alkyl alkoxylates.

4. An ink-jet recording sheet according to claim 1 wherein said hydroxycellulose is selected from the group consisting of hydroxypropylmethyl cellulose, and hydroxypropylethylcellulose.

5. An ink-jet recording sheet according to claim 1 wherein said phase separation additive is selected from the group consisting of poly(vinylalcohol) and poly(vinyl pyyrolidone).

6. An ink-jet recording sheet according to claim 1, wherein said water-absorbing hydrophilic polymeric material comprises a polymer selected from the group consisting of polyvinylalcohol, copolymers of vinylalcohol and vinyl acetate, polyvinyl formal, polyvinyl butyral, gelatin, carboxymethylcellulose, hydroxyethyl cellulose, hydroxypropyl cellulose, hydroxyethyl starch, polyethyl oxazoline, polyethylene oxide, polyethylene glycol, and polypropylene oxide.

7. An ink-jet recording sheet according to claim 6, wherein said water-absorbing hydrophilic polymeric material further comprises polyvinylpyrrolidone.

8. An ink-jet recording sheet according to claim 6, further comprising a polyfunctional aziridine crosslinking agent selected from the group consisting of tris($\beta$-(N-aziridinyl) propionate), pentaerythritol-tris-($\beta$-(N-aziridinyl) propionate), and trimethylol propane-tris-($\beta$-(N-methylaziridinyl propionate).

9. An ink-jet recording sheet according to claim 1 wherein said film substrate is transparent.

* * * * *

UNITED STATES PATENT AND TRADEMARK OFFICE
CERTIFICATE OF CORRECTION

PATENT NO. : 5,707,722
DATED : January 13, 1998
INVENTOR(S) : Mohammed Iqbal, Armin J. Paff, Donald J. Williams It is certified that error appears in the above-identified patent and that said Letters Patent is hereby corrected as shown below:

Column 17, Line 7, after "hydrophilic" insert --polymeric--.

Signed and Sealed this

First Day of June, 1999

Q. TODD DICKINSON

*Attest:*

*Attesting Officer*           Acting Commissioner of Patents and Trademarks